United States Patent
Potash et al.

(10) Patent No.: US 9,219,723 B1
(45) Date of Patent: *Dec. 22, 2015

(54) SOURCE DEVICE FOR SYSTEMS AND METHODS OF VERIFYING AN AUTHENTICATION USING DYNAMIC SCORING

(71) Applicant: Certify Global Inc., Bethesda, MD (US)

(72) Inventors: Marc Potash, Rockville, MD (US); Preetham Gowda, Germantown, MD (US)

(73) Assignee: CERTIFY GLOBAL INC., Bethesda, MD (US)

( * ) Notice: Subject to any disclaimer, the term of this patent is extended or adjusted under 35 U.S.C. 154(b) by 91 days.

This patent is subject to a terminal disclaimer.

(21) Appl. No.: 14/137,617

(22) Filed: Dec. 20, 2013

(51) Int. Cl.
*G06F 7/04* (2006.01)
*H04L 29/06* (2006.01)

(52) U.S. Cl.
CPC ............ *H04L 63/08* (2013.01); *H04L 63/0861* (2013.01)

(58) Field of Classification Search
CPC ........................... H04L 63/08; H04L 63/0861
USPC ............................................................ 726/5
See application file for complete search history.

(56) References Cited

U.S. PATENT DOCUMENTS

| | | | |
|---|---|---|---|
| 6,871,287 B1 | 3/2005 | Ellingson | |
| 7,346,472 B1 | 3/2008 | Moskowitz et al. | |
| 7,620,555 B1 | 11/2009 | Plotkin | |
| 7,660,700 B2 | 2/2010 | Moskowitz et al. | |
| 7,818,583 B2 | 10/2010 | Igarashi | |
| 7,877,296 B2 | 1/2011 | Sherwin et al. | |
| 7,949,494 B2 | 5/2011 | Moskowitz et al. | |
| 8,000,503 B2 | 8/2011 | Kamata et al. | |
| 8,214,175 B2 | 7/2012 | Moskowitz et al. | |
| 8,224,753 B2 | 7/2012 | Atef et al. | |
| 2009/0006230 A1 | 1/2009 | Lyda et al. | |
| 2010/0064365 A1* | 3/2010 | Kanduri et al. | 726/21 |
| 2013/0339018 A1* | 12/2013 | Scheffer et al. | 704/236 |

* cited by examiner

*Primary Examiner* — Mohammad W Reza
(74) *Attorney, Agent, or Firm* — The Marbury Law Group, PLLC

(57) ABSTRACT

A source device for systems and methods of verifying an authentication based on dynamic scoring is disclosed, wherein the source device is configured to receive at least one identification feature from a user, and to communicate the identification feature to a verification unit. The verification unit is configured to generate a base verification score associated with the user based on at least one identification input, the identification input comprising the identification feature, a feature validity rating, and a source device validity rating, to receive a request to access a service, wherein the verification unit compares the base verification score with a service authorization threshold associated with the service, and to grant access to the service when the base verification score meets the service authorization threshold.

16 Claims, 8 Drawing Sheets

SOURCE DEVICE FOR SYSTEMS AND METHODS OF VERIFYING AN AUTHENTICATION USING DYNAMIC SCORING

TECHNICAL BACKGROUND

Authenticating the identity of an individual is an increasingly important function for operators of communication networks, providers of services over communication networks, entities who receive payment for products and services over communications networks, and others due to the growing problems of identity theft and identity fraud. The theft or misrepresentation of information about the identity of an individual used to obtain access to information, products, services, or anything else of value (personally identifiable information), generally referred to as identify theft and identify fraud, are serious problems that can cost companies millions of dollars every year, and can affect a wide range of enterprises, including online retailers, insurance companies, healthcare companies, financial institutions, government agencies, and others. For example, according to the Department of Justice, about 8.6 million households in the United States experienced some form of identity theft in 2010. The total financial loss resulting from this theft was approximately $13.3 billion. According to the Federal Bureau of Investigation, insurance fraud costs the United States over $40 billion per year, and healthcare fraud costs an estimated $80 billion a year.

Various means of authentication of the identity of an individual have been used in an effort to prevent identity theft and identity fraud. Access to services over a communication network is often controlled by requiring a username (i.e., a unique identifier) and a password (i.e., an additional piece of "secret information"). Further, some additional non-public information can be required by the service provider, such as a social security number, an answer to a "secret question" beyond a password, and the like. However, such security measures are vulnerable to identity theft and identity fraud because ensuring the security of such information is difficult. Various types of biometric identifiers (unique physical characteristics) have been used to assist in verifying an authentication, ranging from non-electronic fingerprinting to electronic voice recognition, thumb scans, iris scans, palm scans, face scans, physiological scans, and the like. No identifier, however, is foolproof, whether non-biometric or biometric. Every biometric reader may be subject to "false accept" and "false reject" errors, and as with non-biometric identifiers, ensuring the security of biometric identifiers is difficult. Further, as with non-biometric identifiers, the reliability of biometric identifiers may change depending on the particular transaction in which the individual's identity is authenticated. The reliability of an individual's identify may change, for example, depending on whether the identity is always authenticated in the same location or is sometimes authenticated in different locations.

Overview

In operation, a system of verifying an authentication based on dynamic scoring comprises a source device and a verification unit. The source device is configured to receive an identification feature from a user, and to communicate the identification feature to the verification unit. The verification unit is configured to receive the identification feature from the source device and to generate a base verification score associated with the user based on at least one identification input, the identification input comprising the identification feature, a feature validity rating, and a source device validity rating.

The verification unit is further configured to receive a request to access a service, wherein the verification unit compares the base verification score with a service authorization threshold associated with the service, and to grant access to the service when the base verification score meets the service authorization threshold.

DETAILED DESCRIPTION

Figure 1:
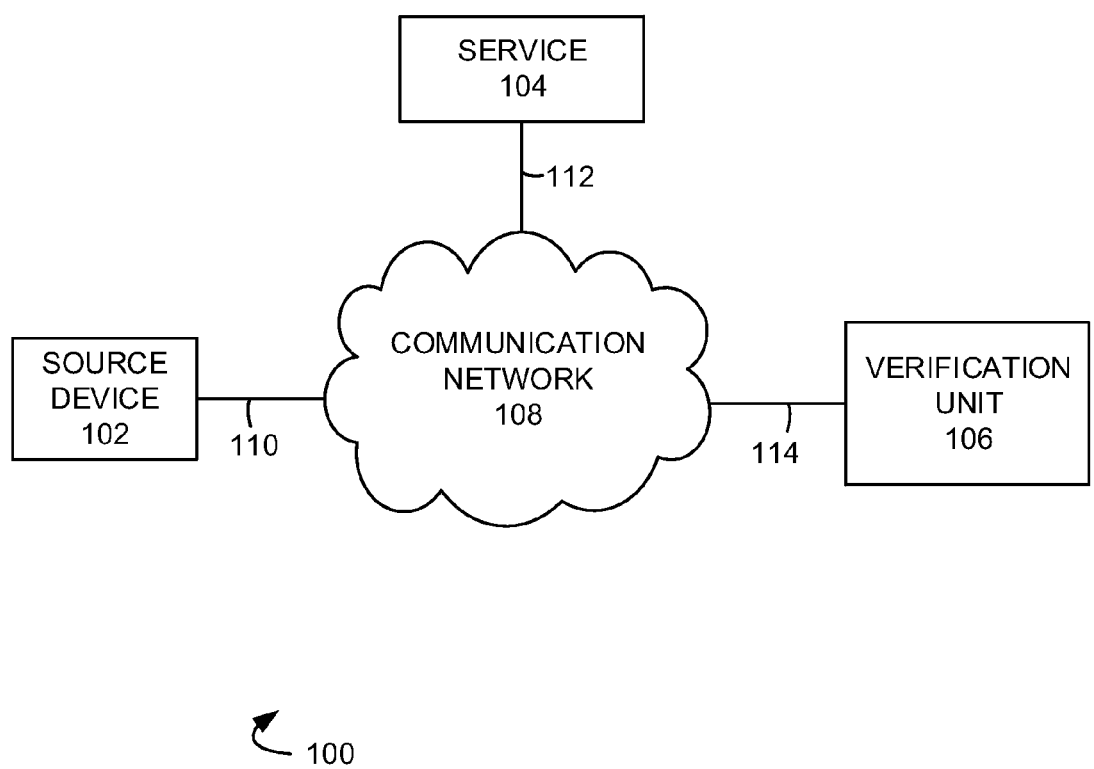
FIG. 1 illustrates an exemplary communication system for verifying an authentication.

FIG. 1 illustrates an exemplary communication system 100 for verifying an authentication comprising source device 102, service 104, verification unit 106, and communication network 108. Source device 102 is configured to receive an identification feature, and can comprise a computing device or computing platform such as a point-of-sale device, a desktop, laptop, palmtop, or tablet computing device, a personal digital assistant, an internet access device, a cell phone, a smart phone, a personal digital assistant, or another device capable of receiving an input comprising an identification feature, including combinations thereof. Source device 102 can comprise a processing system and storage. The processing system may include a microprocessor and/or other circuitry to retrieve and execute software from storage, and the storage can comprise a disk drive, flash drive, memory circuitry, or other memory device. The storage can store software which is used in the operation of source device 102. The software may include computer programs, firmware, or some other form of machine-readable instructions, including an operating system, utilities, drivers, network interfaces, applications, or some other type of software. Processing node 700 may further include other components such as a power management unit, a control interface unit, and the like. Source device 102 can further comprise one or more devices for sampling, scanning or detecting and input, including biometric information. The biometric information can comprise a fingerprint, a palm print, a voice sample, a vein pattern in a retina or in an extremity such as a hand or arm, a venous or arterial pulse, a blood pressure, an iris pattern, face recognition data, a handwriting or signature analysis, venous or arterial pulse, and the like, including combinations thereof.

Source device 102 is located at a known or an identifiable location, which can comprise a retail or a commercial location, an office, a home, a government facility, and the like. Source device 102 can further comprise one or more types of source device, which source device type can be associated with a level of reliability. As one example, a source device which is verified, inspected, or otherwise authorized can be associated with a relatively high level of reliability, whereas a source device which is not verified, inspected, or otherwise authorized can be associated with a relatively low level of reliability. Source device 102 can further comprise a source validity rating, which can be based on at least one of the location of the source and the type of source. Source device can communicate with communication network 108 over communication link 110.

Service 104 comprises a service for which access can be requested by or for a user. The user can be a user of source device 102. Additionally, or alternatively, a third party can interact with source device 102 to request access to service 103 for a user. For example, a nurse can use source device 102 to request access to a service, such as a medication, or a medical test, on behalf of a patient. As another example, a bank clerk can use source device 102 to request access to a bank account on behalf of a customer. Other examples are also possible. Service 104 can comprise a service for which access control by verification of an authentication can be applied, for example, a banking service (such as opening an account, accessing an account, etc.), a medical service (such as visiting a physician's office, receiving hospital care or other medical services, receiving a medical prescription, etc.), access to a location (such as requesting entry to a secured or locked location), a transactional service (such as an e-commerce transaction, an online auction, etc.), a document preparation service (such as approving a contract, approving a utility service for a business or home, etc.), or another service for which access control by verification of an authentication can be applied. Service 104 can be provided through, or access to service 104 can be controlled by, one or more network elements in communication with communication network 108 over communication link 112. The network elements of service 104 can comprise a processor and associated circuitry to execute or direct the execution of computer-readable instructions, such as software, which can be retrieved from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. The network elements of service 104 can receive instructions and other input at a user interface. The network elements of service 104 can include a standalone computing device, a computer system, or a network component, and can be accessible, for example, by a wired or wireless connection, or through an indirect connection such as through a computer network or communication network.

Verification unit 106 comprises a processing node or other network element in communication with communication network 108 over communication link 114. Verification unit 106 can be configured to verify an authentication, among other things. Verification unit 106 can comprise a processor and associated circuitry to execute or direct the execution of computer-readable instructions, such as software, which can be retrieved from storage, from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Verification unit 106 can receive instructions and other input at a user interface. Examples of verification unit 106 can include a standalone computing device, a computer system, and a network component, and can be accessible, for example, by a wired or wireless connection, or through an indirect connection such as through a computer network or communication network.

Communication network 108 can comprise a wired and/or wireless communication network, and can further comprise processing nodes, routers, gateways, and physical and/or wireless data links for carrying data among various network elements, including combinations thereof, and can include a local area network, a wide area network, and an internetwork (including the Internet). Wired network protocols that may be utilized by the communication network comprise Transfer Control Protocol (TCP), Internet Protocol (IP), Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). The communication network may also comprise a wireless network, including base stations, wireless communication nodes, telephony switches, internet routers, network gateways, computer systems, communication links, or some other type of communication equipment, and combinations thereof. Wireless network protocols that may be utilized by the communication network may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). The communication network may also comprise combinations of the foregoing. Other network elements may be present in the communication network which are omitted for clarity, including additional processing nodes, routers, gateways, and physical and/or wireless data links, and in the case of wireless communications systems may further include base stations, base station controllers, gateways, call controllers, and location registers such as a home location register or visitor location register.

Communication links 110, 112, and 114 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal.

Other network elements may be present to facilitate communication in communication system 100 which are omitted for clarity, including additional processing nodes, routers, gateways, and physical and/or wireless data links for carrying data among the various network elements, and in the case of wireless communications systems may further include base stations, base station controllers, gateways, mobile switching centers, dispatch application processors, and location registers such as a home location register or visitor location register.

In operation, to decide whether to provide access to a requested service, a system of verifying an authentication comprises source device 102 and verification unit 106. Source device 102 is configured to receive an identification feature from a user, and to communicate the identification feature to verification unit 106. Verification unit 106 is configured to receive the identification feature from source device 102 (e.g., over communication network 108) and to generate a base verification score associated with the user based on at least one identification input, the identification input comprising the identification feature, a feature validity rating, and a source device validity rating. Verification unit 106 is further configured to receive a request to access a service (such as service 104), wherein verification unit 104 compares the base verification score with a service authorization threshold associated with the service, and to grant access to service 104 when the base verification score meets the service authorization threshold.

In an embodiment, information, including information received at source device 102, is processed with respect to a multiplicity of biometric and non-biometric identifiers to generate dynamic "base verification scores" (which can be used as a starting point in analyzing individual's identity) and "session verification scores" (which can be used to analyze an individual's identity in connection with a particular transaction) to determine the probability of an individual's identity. Exemplary systems can be software and hardware agnostic, and can be used in connection with any operating system and any biometric device complying with such technical standards as ANSI/NIST-IT Biometric Standard, Data Format for the Interchange of Fingerprint, Facial & Other Biometric Information, ANSI/NIST-ITL 1-2011, Update: 2013, Incorporating ANSI/NIST-ITL 1-2011 Sup:Dental & ANSI/NIST-ITL 1-2011, and other internationally recognized biometric standards.

Figure 2:
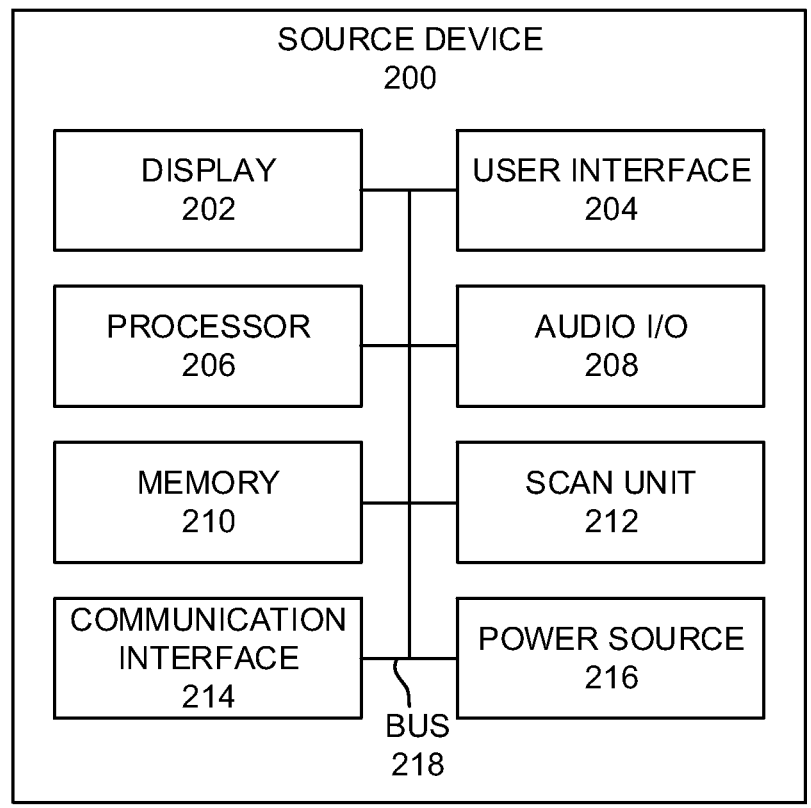
FIG. 2 illustrates an exemplary source device.

FIG. 2 illustrates an exemplary source device 200 comprising display 202, user interface 204, processor 206, audio input/output 208, memory 210, scan unit 212, communication interface 214, and power source 216. Display 202 can display information at the direction of processor 206. Display 202 can be coupled with a display driver (not illustrated) to control a display of information on display 202, including text, images, video, and the like. Display 202 can also be coupled with user interface 204 to receive input, such as by a touch screen or similar device. In addition, or alternatively, user interface 204 can comprise one or more input devices by which source device 200 can receive an input, including by not limited to a keyboard, a mouse, buttons, keys, knobs, sliders, and the like. User interface 204 can be used to provide information to source device 200, to answer questions and/or to respond to queries which can be displayed on display 202, and to control the operation of source device 200.

Source device 200 also comprises audio input and output (I/O) 208 and memory 210. Audio I/O 208 can comprise a speaker to produce sound and/or a microphone to receive sound input. Memory 210 can store data, and can comprise, for example, a disk drive, a flash drive, a solid state memory device, a memory circuitry, or some other memory device, in various forms of volatile and non-volatile memory storage. Memory 210 can store software comprising, for example, computer programs, firmware, or some other form of machine-readable instructions, and may include an operating system, utilities, drivers, network interfaces, applications, or some other type of software.

Scan unit 212 can comprise one or more devices to scan, detect, receive, etc. an identification input. Scan unit 212 can comprise a document scanner to receive an identification input such as a driver's license, a passport, a social security card, a utility bill (as evidence of an address), a smart card scanner, a barcode scanner, a credit card reader, a signature pad, and the like. Scan unit 212 can also comprise one or more sensors or scanners to detect biometric information such as a fingerprint, a palm print, a voice sample, a vein pattern in a retina or in an extremity such as a hand or arm, a venous or arterial pulse, a blood pressure, an iris pattern, face recognition data, a handwriting or signature analysis, a DNA sample, and the like. Examples of the sensor include a camera (including visible light, infrared, ultraviolet, etc.), a scanner, a charge coupled device, a capacitive sensor, a touch screen input unit, a temperature sensor, a pressure sensor, a vibration sensor, an accelerometer, a voice sampler, a voiceprint analyzer, an iris pattern scanner, a vein pattern scanner, a blood pressure detector, a blood vessel pulse detector, a DNA sampler, a scale or other weight detector, a pulse oximeter, an electrocardiogram device, a blood pressure detector, a thermometer, a thermograph, a face recognition scanner, and so forth. Scan unit 212 can use, or can be combined with, audio I/O 208 to receive voice information or other sound input. Other sensors and detectors are also possible, including combinations of the foregoing.

Communication interface 214 can comprise a wired and/or wireless communication interface to enable source device 200 to communicate with another device, for example, directly or over a communication network (such as communication network 108). Communication interface 214 can also one or more transceivers (not illustrated) to enable source device 200 to communicate wirelessly. Wireless communication can be short range or long range, and can include short-range communication with another device (e.g., using a short-range communication protocol such as WiFi, Bluetooth, Zigbee, IrDA, and the like) and long-range communication (e.g., using a cellular communication procotol such as GSM, WiMAX, LTE, LTE-Advanced, and the like).

Processor 206 can retrieve and execute software from memory 210, process data, and control the operation of elements 202, 204, 208, 210, 212, 214 and 216. Elements 202-216 can communicate over communication link 218, such as a communication bus. Each of the elements 202-216 can be disposed within, for example, a housing, but this is by no means a requirement or limitation, and the functions of source device 200 can be distributed over two or more devices which can communicate by a wired or wireless local connection, or over a wired or wireless communication network or another distributed communication system.

Source device 200 can be located at a known or an identifiable location, which can comprise a retail or a commercial location, an office, a home, a government facility, and the like. Source device 200 can further comprise one or more types of source device, which source device type can be associated with a level of reliability. As one example, a source device which is verified, inspected, or otherwise authorized can be associated with a relatively high level of reliability, whereas a source device which is not verified, inspected, or otherwise authorized can be associated with a relatively low level of reliability. Source device 200 can further comprise a source validity rating, which can be based on at least one of the location of the source and the type of source.

Figure 3:
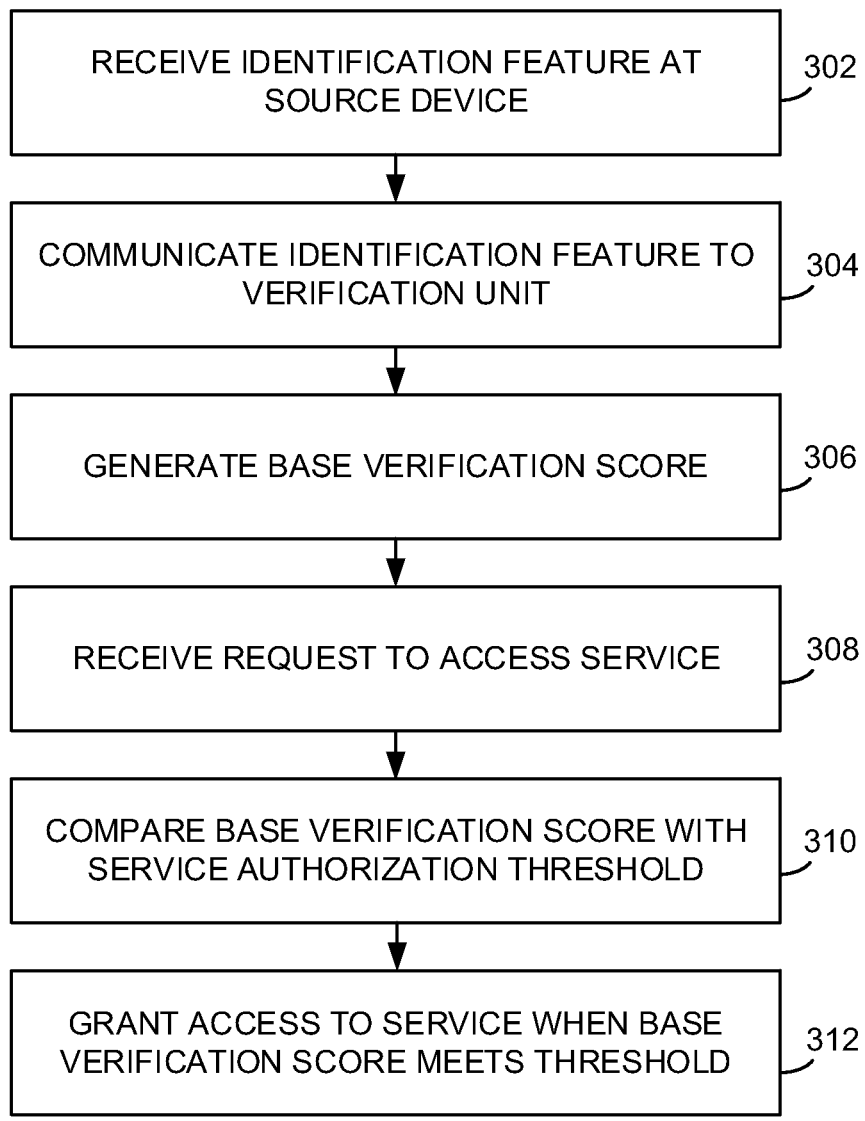
FIG. 3 illustrates an exemplary method of verifying an authentication.

FIG. 3 illustrates an exemplary method of verifying an authentication using a source device. In operation 302, receive an identification feature is received from a user at a source device. The identification input can be received at source device 102. The identification input can comprise an identification feature, such as biometric information including a fingerprint, a palm print, a voice sample, a vein pattern in a retina or in an extremity such as a hand or arm, a venous or arterial pulse, a blood pressure, an iris pattern, face recognition data, a handwriting or signature analysis, and the like, including combinations thereof. The identification feature can further comprise demographic information, such as name, address, phone number, citizenship, and other demographic information, including combinations thereof. The identification feature can also comprise a document or an identification number from a document, such as a driver's license, social security number, a passport, a utility account number (e.g., for a utility such as gas, electricity, telephone service, internet service, and the like). The identification feature is communicated to a verification unit (operation 304). For example, source device 102 can communicate the received identification feature to verification unit 106 over communication network 108.

In operation 306, a base verification score associated with a user is generated based on at least one identification input, the identification input comprising the identification feature, a feature validity rating, a source where the identification feature is received, and a source validity rating. The feature validity rating comprises an evaluation of the reliability and/or the verifiability of an identification feature. For example, a social security number can be associated with one validity rating, because of its verifiability. A driver's license, which typically includes a photograph, can be associated with a higher validity rating than a social security number. A passport can be associated with a still higher validity rating than a driver's license, because of the relative difficulty of counterfeiting it. Biometric information can be associated with a higher validity rating than a document provided by a user, as can information provided by a third party source.

The identification input can further comprise a source where the identification feature is received. For example, the source of the identification feature can comprise source device 102. Source device 102 can comprise a device whose type, location, manufacturer, operator, etc. is known, or whose type, location, manufacturer, operator, etc. is unknown. The source can also comprise a third party source, such as a governmental or private entity. Further, the identification feature can further comprise a source validity rating, which can comprise an evaluation of the reliability of the source of the identification feature. For example, a source device which is inspected or verified by an operator of verification unit 106 can be associated with a higher source validity rating than a source device which is not inspected and/or verified.

In an embodiment, one or more identification features can also be received from another source, and can be stored in a memory associated with verification unit 106. For example, identification features can be provided by a third party source, such as a government or private agency, for example, the Social Security Agency, the Office of Foreign Assets Control (OFAC), a credit agency such as Equifax, Experian, TransUnion, and the like. An identification feature received from another source can be correlated with an identification feature received through source device 102. Received identification features can be stored in a memory associated with verification unit 106. A third party source can also be associated with a source validity rating which is based on the reliability and/or verifiability of the third party source.

In operation 308, a request to access a service is received. The service can comprise a service for which access control by verification of an authentication can be applied, for example, a banking service (such as opening an account, accessing an account, etc.), a medical service (such as visiting a physician's office, receiving hospital care or other medical services, receiving a medical prescription, etc.), access to a location (such as requesting entry to a secured or locked location), a transactional service (such as an e-commerce transaction, an online auction, etc.), a document preparation service (such as approving a contract, approving a utility service for a business or home, etc.), or another such service.

The base verification score is compared with a service authorization threshold associated with the service (operation 310). The service authorization threshold reflects a level of verification required for access to the service. The service authorization threshold can be determined by a provider of service 104, which can be different than an operator of verification unit 106. When the base verification score meets the service authorization threshold, access to the service can be granted (operation 312).

Figure 4:
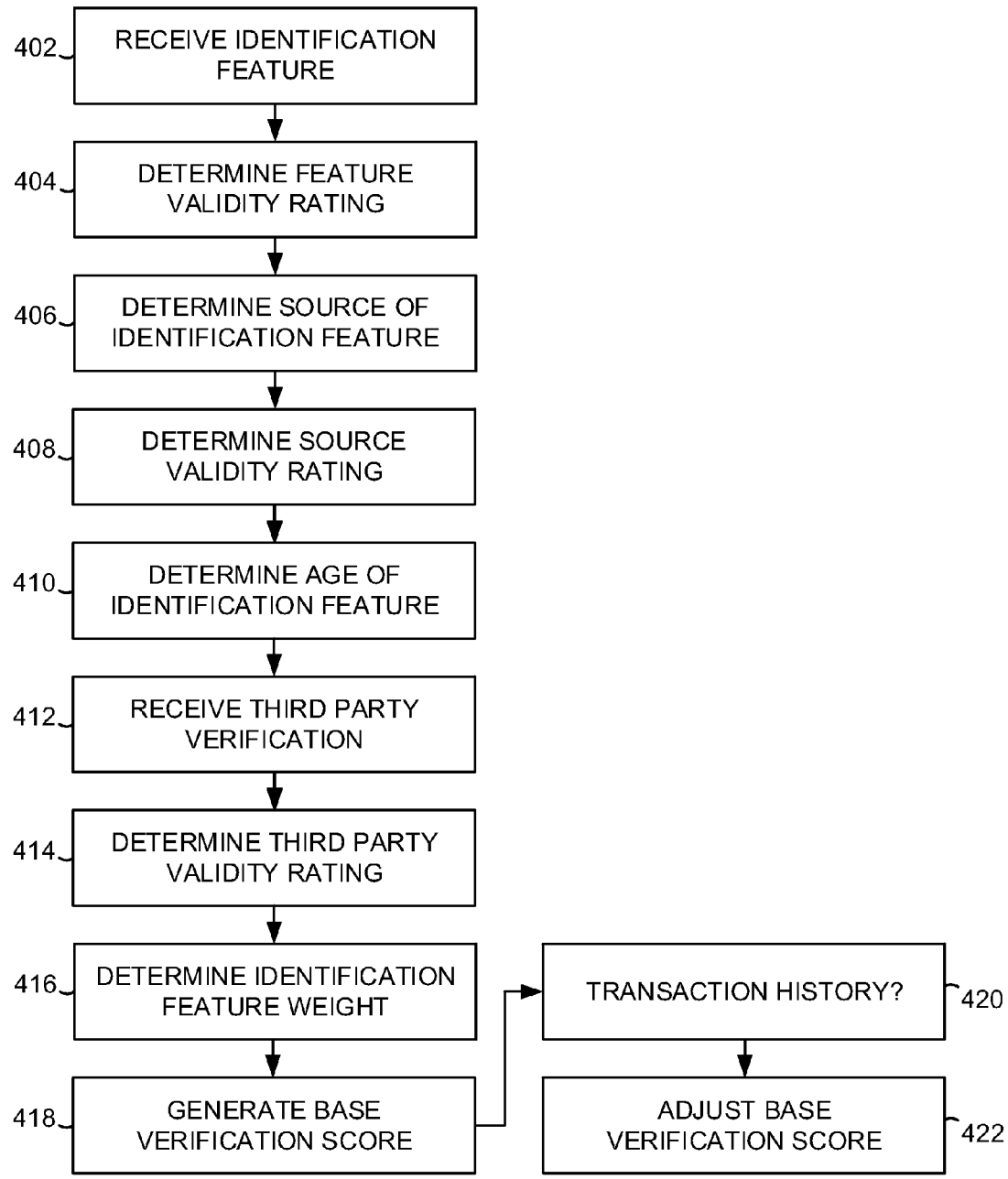
FIG. 4 illustrates another exemplary method of verifying an authentication.

FIG. 4 illustrates another exemplary method of verifying an authentication. In operation 402, an identification feature is received. The identification feature is typically associated with a user of source device 102, and can comprise biometric information including a fingerprint, palm print, voice sample, retinal vein pattern, iris pattern, a venous or arterial pulse, a blood pressure, face recognition, handwriting analysis, signature analysis, and the like, including combinations thereof; demographic information, such as name, address, phone number, citizenship, and other demographic information, including combinations thereof; a document or identification number from a document, such as a driver's license, social security number, a passport, a utility account number (e.g., for a utility such as gas, electricity, telephone service, internet service, etc.), and the like. Received identification features can be stored in a memory, for example, associated with verification unit 106.

In operation 404, a feature validity rating is determined for the received identification feature. The validity rating comprises an evaluation of the reliability and/or the verifiability of an identification feature. For example, a social security number can be associated with one validity rating, because of its verifiability. A driver's license, which typically includes a photograph, can be associated with a higher validity rating than a social security number. A passport can be associated with a still higher validity rating than a driver's license, due to the difficulty of counterfeiting it. Biometric information can be associated with a higher validity rating than a document provided by a user, as can information provided by a third party source.

Next, a source of the identification feature is determined (operation 406). The source can comprise a source device where the identification feature is received, such as source device 102. In such case, source device 102 can comprise a device whose type, location, manufacturer, operator, etc. is known, or whose type, location, manufacturer, operator, etc. is unknown. The source can also comprise a third party source, such as a governmental or private entity. For example, the identification features can be provided by a third party source, such as a government or private agency, e.g., the Social Security Agency, the Office of Foreign Assets Control (OFAC), a credit agency such as Equifax, Experian, TransUnion, and the like.

A validity rating is then determined for the determined source (operation 408). The source validity rating can comprise an evaluation of the reliability of the source of the identification feature. A third party source can also be associated with a source validity rating, so that the source validity rating is based on the reliability and/or verifiability of the third party source. In an embodiment, the source validity rating can be used to determine how much weight to give to the received identification features based on the source.

The source validity rating can comprise a type of source. For example, source device 102 can comprise a device provided by an operator of verification unit 106, such that source device 102 comprises a certified or verified source device, which can be associated with a relatively high type of source rating. Source device 102 can further comprise a device which is provided by a third party and which is inspected or verified by an operator of verification unit 106; such a device can be associated with a lower source validity rating than a source device which is provided by the operator of verification unit 106. Source device 102 can also comprise a device provided by a third party and which is not inspected and/or verified; such a device can be associated with a still lower type of source rating.

The source validity rating can also comprise a rating of a location where the identification features is received. For example, one source validity rating can be associated with a source located in a private home, and a higher source validity rating can be associated with a source located at a point of sale in a commercial location, such as a pharmacy. A higher source validity rating can be associated with a source located in a bank, and a still higher source validity rating can be associated with a source located at a doctor's office. Other examples are also possible. Thus, the source validity rating can comprise an evaluation of the reliability and/or verifiability of the source based on the source's location.

Next, an age of the identification feature is determined (operation 410). For example, where the identification feature is a document, such as a driver's license or a passport, the date of production or issuance of the document can be determined. In an embodiment, a weight associated with the identification input or the identification feature can be decreased when the age of the identification feature meets a threshold age. Additionally, or alternatively, a weight associated with the identification input or the identification feature can be decreased based on the age of the identification feature, where the older the age of the document, the more the weight is decreased. An older documentary identification can be deemed less reliable than a more recent document. Similarly, current biometric data, such as a fingerprint, vein pattern, iris pattern, etc., received at source device 102, can be deemed more reliable than non-current biometric data, such as an image of a fingerprint on a driver's license, or a photograph in a passport.

Third party verification can be received for the identification feature (operation 412). For example, a government agency can provide verification of a document received as an identification feature. As another example, an employer can provide verification of demographic information such as name, address, phone number, citizenship, and the like. As yet another example, a physician can provide verification of biometric information. Other examples are also possible, including combinations thereof. A validity rating of the third party can also be determined (operation 414). The third party validity rating can comprise an evaluation of the reliability of the third party providing the third party verification of the received identification feature. For example, a government agency, an employer of the user, and the physician can be evaluated based on reliability and/or verifiability, and each can be associated with a third party validity rating.

In operation 416, an identification feature weight is determined, comprising a weight to be given to a particular identification feature. The identification feature weight can be based on at least one of the feature validity rating, the source where the feature is received, the source validity rating, the third party verification of the identification feature, and the third party validity rating. Where two or more identification features are received, each identification feature can be associated with an identification feature weight. Using the identification feature and the identification feature weight, a base verification score is generated (operation 418). The base verification score can be stored, for example, in a memory associated with verification unit 106.

The generated base verification score can be adjusted over time. After a base verification score is generated, a new identification feature can be received, for example, at a source device, from a third party, and the like. A feature validity rating, a source of the new identification feature, a source validity rating, an age of the identification feature, and/or a third party verification and an associated third party validity rating can be determined for the new verification feature. Additionally, or alternatively, the base verification score can be used when a request to access a service is received, such as a request as illustrated in FIG. 3. The service can comprise a service for which access control by verification of an authentication can be applied, such as a banking service, a medical service, access to a location, a transactional service, a document preparation service, or another such service. Whether access to the service is granted or not can be stored, for example, in a memory associated with verification unit 106. Such a history can generally be described as a transaction history, and can comprise one or more requests to access a service, an indication of the base verification score associated with the requester at the time the request is received, and an indication of whether access is granted to the service, among other things. Accordingly, it can be determined whether any transaction history is stored (operation 420). Based on the transaction history, the base verification score can be adjusted to be higher or lower (operation 422). For example, denial of access to a requested service can cause the base verification score to be adjusted lower, while granting of access to a requested service can cause the base verification score to be adjusted higher.

Figure 5:
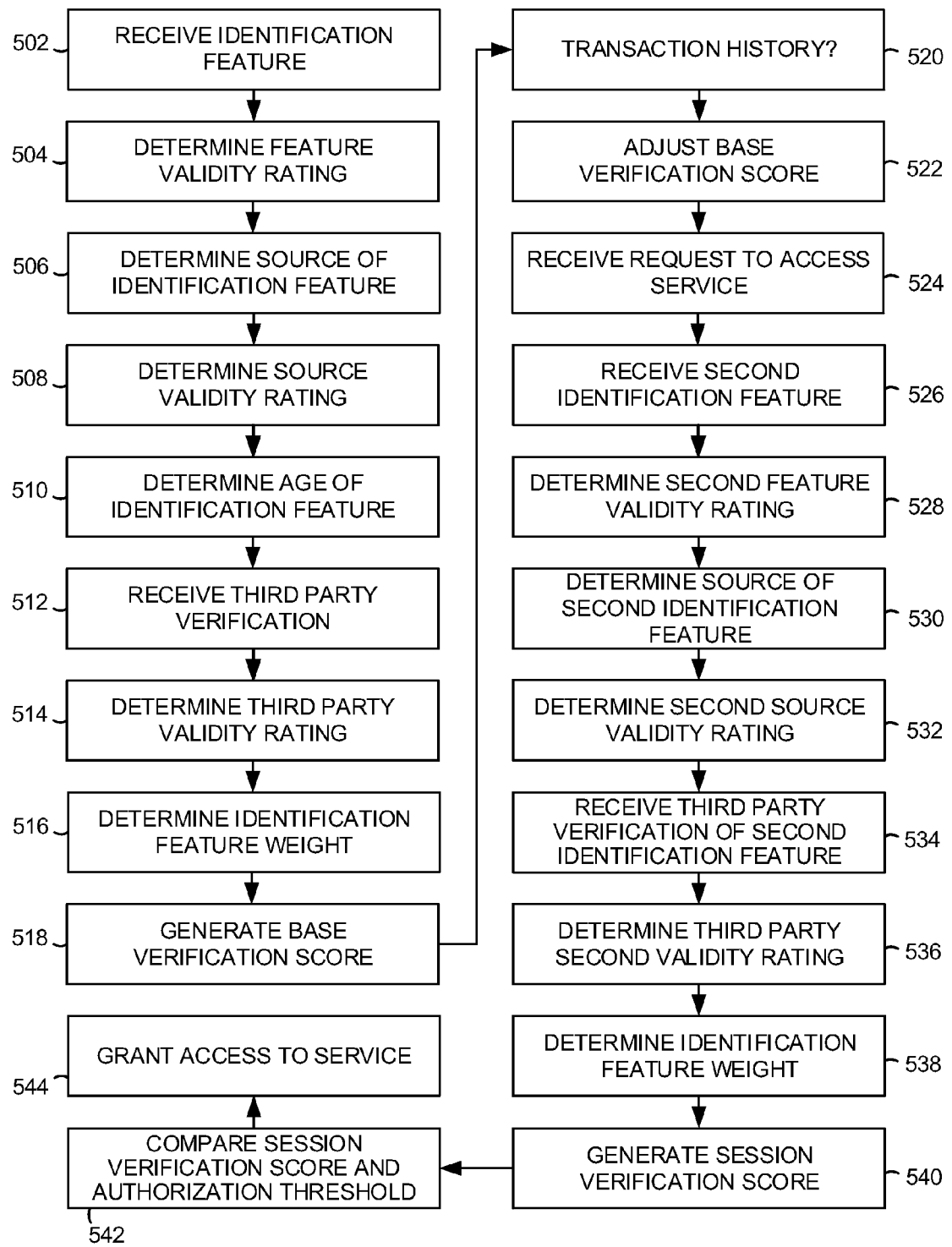
FIG. 5 illustrates another exemplary method of verifying an authentication.

FIG. 5 illustrates another exemplary method of verifying an authentication. In operation 502, an identification feature is received at a source device, for example, source device 102. The identification feature is typically associated with a user, and can comprise biometric information including a fingerprint, a palm print, a voice sample, a retinal vein pattern, an iris pattern, a venous or arterial pulse, a blood pressure, face recognition data, a handwriting analysis, a signature analysis, and the like, including combinations thereof; demographic information, such as name, address, phone number, citizenship, and other demographic information, including combinations thereof; a document or identification number from a document, such as a driver's license, social security number, a passport, a utility account number (e.g., for a utility service), and the like. Received identification features can be stored in a memory, for example, associated with verification unit 106. In an embodiment, in addition to the identification feature received at source device 102, one or more additional identification features can be provided by a third party source, such as a government or private agency, e.g., the Social Security Agency, the Office of Foreign Assets Control (OFAC), a credit agency such as Equifax, Experian, TransUnion, and the like.

In operation 504, a feature validity rating is determined for the received identification feature. The validity rating comprises an evaluation of the reliability and/or the verifiability of an identification feature. For example, a social security number can be associated with one validity rating, because of its verifiability. A driver's license, which typically includes a photograph, can be associated with a higher validity rating than a social security number. A passport can be associated with a still higher validity rating than a driver's license. Biometric information can be associated with a higher validity rating than a document provided by a user, as can information provided by a third party source.

Next, a source of the identification feature is determined (operation 506). The source can comprise a source device where the identification feature is received, such as source device 102. In such case, source device 102 can comprise a device whose type, location, manufacturer, operator, etc. is known or unknown. The source can also comprise a third party source, such as a governmental or private entity.

A validity rating is then determined for the determined source (operation 508). The source validity rating can comprise an evaluation of the reliability of the source of the identification feature. A third party source can also be associated with a source validity rating which is based on the reliability and/or verifiability of the third party source. In an embodiment, the source validity rating can be used to determine how much weight to give to the received identification features based on the source.

The source validity rating can comprise a type of source. For example, source device 102 can comprise a device provided by an operator of verification unit 106, such that source device 102 comprises a certified or verified source device, which can be associated with a relatively high type of source rating. Source device 102 can further comprise a device which is provided by a third party and which is inspected or verified by an operator of verification unit 106; such a device can be associated with a lower source validity rating than a source device which is provided by the operator of verification unit 106. Source device 102 can also comprise a device provided by a third party and which is not inspected and/or verified; such a device can be associated with a still lower type of source rating.

The source validity rating can also comprise a rating of a location where the identification features is received. As examples, one source validity rating can be associated with a source located in a private home, and a higher source validity rating can be associated with a source located at a point of sale in a drug store. An even higher source validity rating can be associated with a source located in a bank, and a still higher source validity rating can be associated with a source located at a doctor's office. Thus, the source validity rating can comprise an evaluation of the reliability and/or verifiability of the source based on the source's location.

Next, an age of the identification feature is determined (operation 510). For example, where the identification feature is a document, such as a driver's license or a passport, the date of production or issuance of the document can be determined. In an embodiment, a weight associated with the identification input or the identification feature can be decreased when the age of the identification feature meets a threshold age. Additionally, or alternatively, a weight associated with the identification input or the identification feature can be decreased based on the age of the identification feature. An older documentary identification can be deemed less reliable than a more recent document. Similarly, current biometric data, such as a fingerprint, vein pattern, iris pattern, etc., received at source device 102, can be deemed more reliable than non-current biometric data, such as an image of a fingerprint on a driver's license, or a photograph in a passport.

Third party verification can be received for the identification feature (operation 512). For example, a government agency can provide verification of a document received as an identification feature. As another example, an employer can provide verification of demographic information such as name, address, phone number, citizenship, and the like. As yet another example, a physician can provide verification of biometric information. Other examples are also possible, including combinations thereof. A validity rating of the third party can also be determined (operation 514). The third party validity rating can comprise an evaluation of the reliability of the third party providing the third party verification of the received identification feature. For example, the government agency, the employer, and the physician can be evaluated based on reliability and/or verifiability, and each can be associated with a third party validity rating.

In operation 516, an identification feature weight is determined, comprising a weight to be placed on a particular identification feature. The identification feature weight can be based on at least one of the feature validity rating, the source where the feature is received, the source validity rating, the third party verification of the identification feature, and the third party validity rating. Where two or more identification features are received, each identification feature can be associated with an identification feature weight. Using the identification feature and the identification feature weight, a base verification score is generated (operation 518). The base verification score can be stored, for example, in a memory associated with verification unit 106.

The generated base verification score can be adjusted over time. After a base verification score is generated, a new identification feature can be received, for example, at a source device, or from a third party, and the like. A feature validity rating, a source of the new identification feature, a source validity rating, an age of the identification feature, and/or a third party verification and an associated third party validity rating can be determined for the new verification feature. Additionally, or alternatively, the base verification score can be used when a request to access a service is received, such as a request as illustrated in FIG. 3. The service can comprise a service for which access control by verification of an authentication can be applied, such as a banking service, a medical service, access to a location, a transactional service, a document preparation service, or another such service. Whether access to the service is granted or not can be stored, for example, in a memory associated with verification unit 106. Thus, the transaction history can comprise one or more requests to access a service, an indication of the base verification score associated with the requester at the time the request is received, and an indication of whether access is granted to the service, among other things. Accordingly, it can be determined whether any transaction history is stored (operation 520). Based on the transaction history, the base verification score can be adjusted to be higher or lower (operation 522). For example, denial of access to a requested service can cause the base verification score to be adjusted lower, while granting of access to a requested service can cause the base verification score to be adjusted higher.

In an embodiment, a base verification score can be generated for a user of system 100 when an account or other record is created for the user. An account can be created for the user by an operator of verification unit 106, or by the user during an initial authentication attempt, for example, when requesting to access a service. In an embodiment, to create an account at least one identification feature is required, which can be used to prevent a duplicate account or record from being created.

Subsequent to the generation and/or adjustment of the base verification score, a request to access a service is received (operation 524), and when the service is received, a session verification score is generated, as further described below. Both the base verification score and the session verification score can be used to determine whether to grant access to the requested service. The service can comprise a service for which access control by verification of an authentication can be applied.

When the request to access the service is received, a second identification feature is received (operation 526). The second identification feature can be received at a source device (e.g., source device 102), and can comprise biometric information, demographic information, a document or identification number from a document, and the like. The received identification feature can be stored in a memory, for example, associated with verification unit 106.

In operation 528, a second feature validity rating is determined for the received second identification feature. The second validity rating comprises an evaluation of the reliability and/or the verifiability of an identification feature. For example, a social security number can be associated with one validity rating, because of its verifiability. A driver's license, which typically includes a photograph, can be associated with a higher validity rating than a social security number. A passport can be associated with a still higher validity rating than a driver's license. Biometric information can be associated with a higher validity rating than a document provided by a user, as can information provided by a third party source.

Next, a second source of the second identification feature is determined (operation 530). The second source can comprise a source device where the identification feature is received, such as source device 102. In such case, source device 102 can comprise a device whose type, location, manufacturer, operator, etc. is known or unknown. The source can also comprise a third party source, such as a governmental or private entity.

A validity rating is then determined for the determined second source (operation 532). The second source validity rating can comprise an evaluation of the reliability of the source of the identification feature. In an embodiment, the source validity rating can be used to determine how much weight to give to the source of the received identification features.

The source validity rating can comprise a type of source. For example, source device 102 can comprise a device provided by an operator of verification unit 106, such that source device 102 comprises a certified or verified source device, which can be associated with a relatively high type of source rating. Source device 102 can further comprise a device which is provided by a third party and which is inspected or verified by an operator of verification unit 106, and such a device can be associated with a lower source validity rating than a source device which is provided by the operator of verification unit 106. Source device 102 can also comprise a device provided by a third party and which is not inspected and/or verified, and such a device can be associated with a still lower type of source rating.

The source validity rating can also comprise a rating of a location where the identification features is received. For example, one source validity rating can be associated with a source located in a private home, and a higher source validity rating can be associated with a source located at a commercial point of sale, such as a pharmacy. A higher source validity rating can be associated with a source located in a bank, and a still higher source validity rating can be associated with a source located at a doctor's office. Thus, the source validity rating can comprise an evaluation of the reliability and/or verifiability of the source based on the source's location.

Third party verification can be received for the identification feature (operation 534). For example, a government agency can provide verification of a document received as an identification feature. As another example, an employer can provide verification of demographic information such as name, address, phone number, citizenship, and the like. As yet another example, a physician can provide verification of biometric information. Other examples are also possible, including combinations thereof. A second validity rating of the third party can also be determined (operation 536). The third party second validity rating can comprise an evaluation of the reliability of the third party providing the third party verification of the received identification feature, and each of the government agency, the employer, and the physician can be evaluated based on reliability and/or verifiability, and can be associated with a third party validity rating.

In operation 538, a second identification feature weight is determined, comprising a weight to be placed on the second identification feature. The second identification feature weight can be based on at least one of the second feature validity rating, the second source where the second feature is received, the second source validity rating, the third party second verification of the identification feature, and the third party second validity rating. Where two or more second identification features are received, each identification feature can be associated with an identification feature weight.

Using the base verification score, the second identification feature and the identification feature weight, a session verification score is generated (operation 540). The session verification score can be stored, for example, in a memory associated with verification unit 106.

The session verification score is compared with a service authorization threshold associated with the service (operation 542). The service authorization threshold reflects a level of verification required for access to the service. The service authorization threshold can be determined by a provider of service 104, which can be different than an operator of verification unit 106. When the base verification score meets the service authorization threshold, access to the service can be granted (operation 544).

As one example of an application of the method illustrated in FIG. 5, a patient can visit his new doctor for the first time. The doctor's office can use a system analogous to system 100 to sign patients in and to verify their identity. A receptionist can ask the patient for certain identification features required by the office, for example a name, a date of birth, a gender, and insurance information. The receptionist can create an account or record for the patient using the received identification features. The system can determine if the added user already exists, and if so, the accounts can be merged. The received identification features can be input into a device at the doctor's office (analogous to source device 102). The identification features, representations of the identification features, or information describing the identification features, can be sent over communication network 108 to verification unit 106. Verification unit 106 can determine a feature validity rating of each of the identification features. Verification unit 106 can also determine a source device (the device in the doctor's office) and a source validity rating for the source device. Further, verification unit 106 can determine an age of each of the identification features. Where applicable, verification unit 106 can also attempt to receive third party verification of each of the identification features, and to determine a third party validity rating of each verifying third party. Based on the feature validity rating, the source where the feature is received, the source validity rating, the third party verification of the identification feature, and the third party validity rating, an identification feature weight can be determined for each of the identification features. Further, verification unit 106 can generate a base verification score for the patient based on the identification feature weights.

The next time the patient visits the doctor's office, the receptionist can ask for second identification features, such as the name and/or date of birth of the patient. The second identification features, representations of the identification features, or information describing the identification features, can be sent over communication network 108 to verification unit 106. Verification unit 106 can determine a feature second validity rating of each of the identification features. Verification unit 106 can also determine a second source device (which can be the same device in the doctor's office, though it may be a different device, or a non-certified device, and the like) and a source validity rating for the source device. Further, where applicable, verification unit 106 can determine an age of each of the identification features, and verification unit 106 can also attempt to receive third party verification of each of the identification features, as well as determine a third party validity rating of each verifying third party. Based on the feature validity rating, the source where the feature is received, the source validity rating, the third party verification of the identification feature, and the third party validity rating, an identification feature weight can be determined for each of the second identification features. Further, verification unit 106 can generate a base verification score for the patient based on the base verification score and the identification feature weights for each of the second identification features.

The session verification score can be compared to an authorization threshold, where in this case when the patient's session verification score meets the authorization threshold, the patient's identification (i.e., the patient's authentication) can be deemed verified. Where the patient's session verification score does not meet the authorization threshold, the patient's identification can be deemed not verified. In an embodiment, the authorization threshold can comprise a difference between the base verification score and the session verification score, and when the patient's session verification score is greater than the difference between the base verification score and the session verification score, the patient's identification can be deemed not verified.

Figure 6:
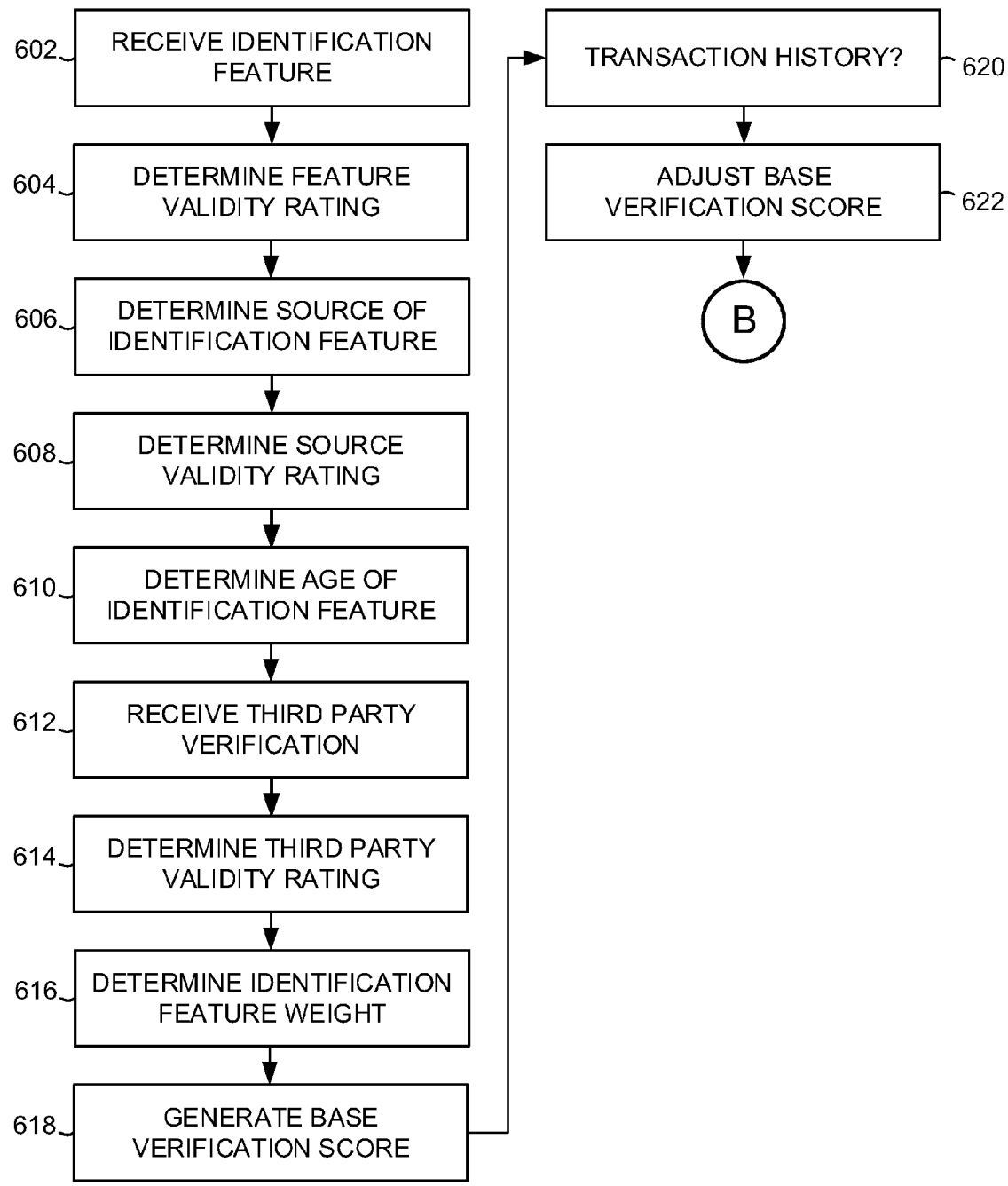
FIGS. 6 and 7 illustrate another exemplary method of verifying an authentication.
Figure 7:
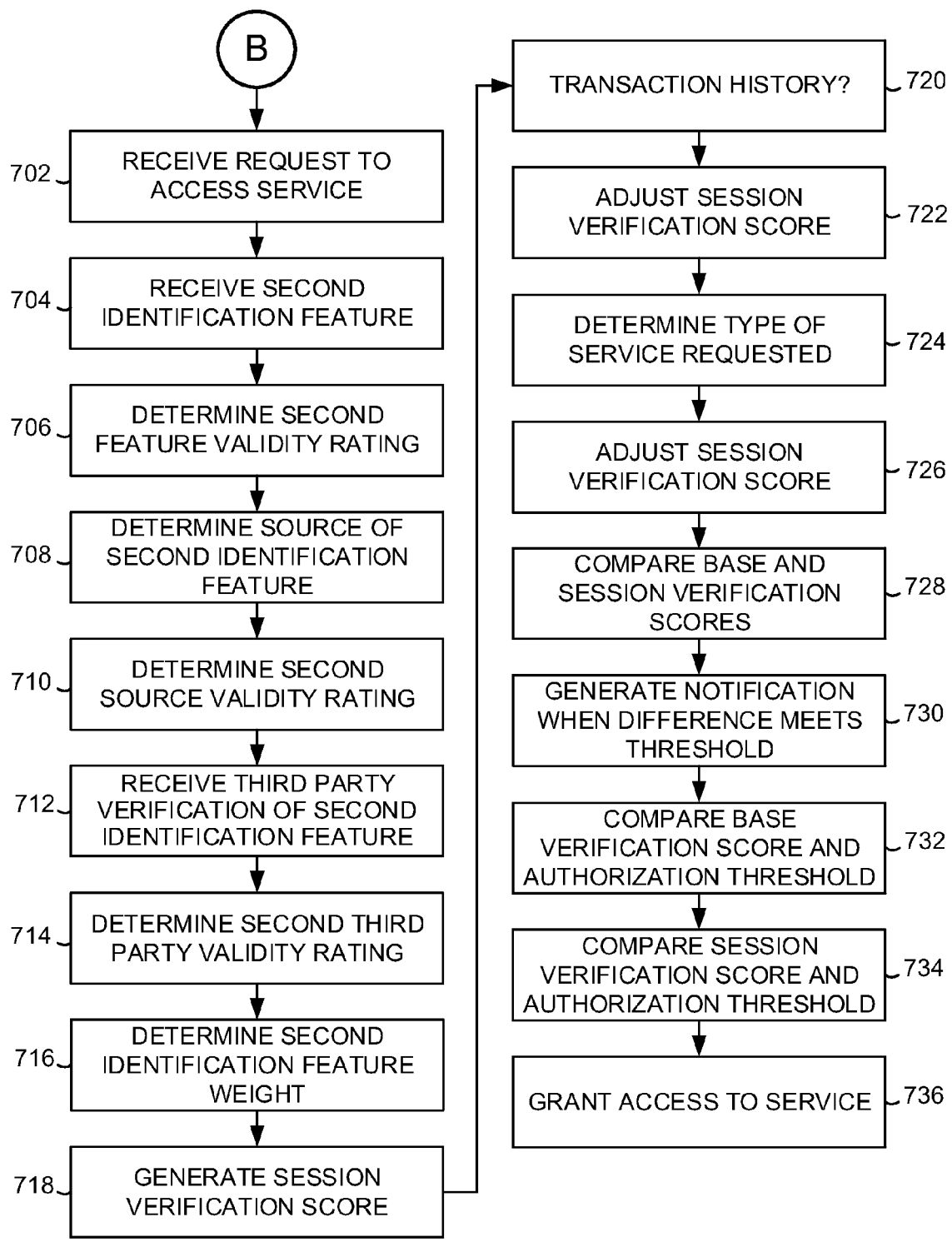

FIGS. 6 and 7 illustrate another exemplary method of verifying an authentication. In operation 602, an identification feature is received, and in operation 604, a feature validity rating is determined for the received identification feature. The identification feature can be received at source device 102 and communicated to verification unit 106 over communication network 108. The identification feature is typically associated with a user, and can comprise biometric information, demographic information, a document or identification number from a document, and the like. Received identification features can be stored in a memory, for example, associated with verification unit 106. In an embodiment, one or more additional identification features can be provided by a third party source, such as a government or private agency, e.g., the Social Security Agency, the Office of Foreign Assets Control (OFAC), a credit agency such as Equifax, Experian, TransUnion, and the like.

The validity rating comprises an evaluation of the reliability and/or the verifiability of an identification feature. For example, a social security number can be associated with one validity rating, because of its verifiability. A driver's license, which typically includes a photograph, can be associated with a higher validity rating than a social security number. A passport can be associated with a still higher validity rating than a driver's license. Biometric information, and information provided by a third party source, can be associated with a higher validity rating than a document provided by a user.

Next, a source of the identification feature is determined (operation 606). The source can comprise a source device where the identification feature is received, such as source device 102. In such case, source device 102 can comprise a device whose type, location, manufacturer, operator, etc. is known or unknown. The source can also comprise a third party source, such as a governmental or private entity.

A validity rating is then determined for the determined source (operation 608). The source validity rating can comprise an evaluation of the reliability of the source of the identification feature. A third party source can also be associated with a source validity rating which is based on the reliability and/or verifiability of the third party source. In an embodiment, the source validity rating can be used to determine how much weight to give to the source of the received identification features.

The source validity rating can comprise a type of source. For example, source device 102 can comprise a device provided by an operator of verification unit 106, such that source device 102 comprises a certified or verified source device, which can be associated with a relatively high type of source rating. Source device 102 can further comprise a device which is provided by a third party and which is inspected or verified by an operator of verification unit 106; such a device can be associated with a lower source validity rating than a source device which is provided by the operator of verification unit 106. Source device 102 can also comprise a device provided by a third party and which is not inspected and/or verified; such a device can be associated with a still lower type of source rating.

The source validity rating can also comprise a rating of a location where the identification features is received. The source validity rating can vary depending on the reliability and/or verifiability of the source based on the source's location.

Next, an age of the identification feature is determined (operation 610). For example, where the identification feature is a document, such as a driver's license or a passport, the date of production or issuance of the document can be determined. In an embodiment, a weight associated with the identification input or the identification feature can be decreased when the age of the identification feature meets a threshold age. Additionally, or alternatively, a weight associated with the identification input or the identification feature can be decreased based on the age of the identification feature. An older documentary identification can be deemed less reliable than a more recent document. Similarly, current biometric data, such as a fingerprint, vein pattern, iris pattern, etc., received at source device 102, can be deemed more reliable than non-current biometric data, such as an image of a fingerprint on a driver's license, or a photograph in a passport.

Third party verification can be received for the identification feature (operation 612). For example, a government agency can provide verification of a document received as an identification feature. As another example, an employer can provide verification of demographic information such as name, address, phone number, citizenship, and the like. As yet another example, a physician can provide verification of biometric information. Other examples are also possible, including combinations thereof. A validity rating of the third party can also be determined (operation 614). The third party validity rating can comprise an evaluation of the reliability of the third party providing the third party verification of the received identification feature. The government agency, the employer, and the physician can be evaluated based on reliability and/or verifiability, and each can be associated with a third party validity rating.

In operation 616, an identification feature weight is determined, comprising a weight to be placed on a particular identification feature. The identification feature weight can be based on at least one of the feature validity rating, the source where the feature is received, the source validity rating, the third party verification of the identification feature, and the third party validity rating. Where two or more identification features are received, each identification feature can be associated with an identification feature weight. Using the identification feature and the identification feature weight, a base verification score is generated (operation 618). The base verification score can be stored, for example, in a memory associated with verification unit 106.

The generated base verification score can be adjusted over time. After a base verification score is generated, a new identification feature can be received, for example, at a source device, or from a third party, and the like. A feature validity rating, a source of the new identification feature, a source validity rating, an age of the identification feature, and/or a third party verification and an associated third party validity rating can be determined for the new verification feature. Additionally, or alternatively, the base verification score can be used when a request to access a service is received, such as a request as illustrated in FIG. 3. The service can comprise a service for which access control by verification of an authentication can be applied, such as a banking service, a medical service, access to a location, a transactional service, a document preparation service, or another such service. Whether access to the service is granted or not can be stored, for example, in a memory associated with verification unit 106. Such a history can generally described as a transaction history, and can comprise one or more requests to access a service, an indication of the base verification score associated with the requester at the time the request is received, and an indication of whether access is granted to the service, among other things. Accordingly, it can be determined whether any transaction history is stored (operation 620). Based on the transaction history, the base verification score can be adjusted to be higher or lower (operation 622). For example, denial of access to a requested service can cause the base verification score to be adjusted lower, while granting of access to a requested service can cause the base verification score to be adjusted higher.

In an embodiment, a base verification score can be generated for a user of system 100 when an account or other record is created for the user. An account can be created for the user by an operator of verification unit 106, or by the user during an initial authentication attempt, for example, when requesting to access a service. In an embodiment, to create an account at least one identification feature is required, which can be used to prevent a duplicate account or record from being created.

Referring now to FIG. 7, subsequent to the generation and/or adjustment of the base verification score, a request to access a service is received (operation 702), and when the service is received, a session verification score is generated, as further described below. Both the base verification score and the session verification score can be used to determine whether to grant access to the requested service. The service can comprise a service for which access control by verification of an authentication can be applied.

When the request to access the service is received, a second identification feature is received (operation 704). The second identification feature can be received at a source device (e.g., source device 102), and can comprise biometric information, demographic information, a document or identification number from a document, and the like. The received identification feature can be stored in a memory, for example, associated with verification unit 106.

In operation 706, a second feature validity rating is determined for the received second identification feature. The second validity rating comprises an evaluation of the reliability and/or the verifiability of an identification feature.

Next, a second source of the second identification feature is determined (operation 708). The second source can comprise a source device where the identification feature is received, such as source device 102. In such case, source device 102 can comprise a device whose type, location, manufacturer, operator, etc. is known or unknown. The source can also comprise a third party source, such as a governmental or private entity.

A validity rating is then determined for the determined second source (operation 710). The second source validity rating can comprise an evaluation of the reliability of the source of the identification feature. In an embodiment, the source validity rating can be used to determine how much weight to give to the source of the received identification features.

The source validity rating can comprise a type of source. For example, source device 102 can comprise a device provided by an operator of verification unit 106, such that source device 102 comprises a certified or verified source device, which can be associated with a relatively high type of source rating. Source device 102 can further comprise a device which is provided by a third party and which is inspected or verified by an operator of verification unit 106; such a device can be associated with a lower source validity rating than a source device which is provided by the operator of verification unit 106. Source device 102 can also comprise a device provided by a third party and which is not inspected and/or verified; such a device can be associated with a still lower type of source rating.

The source validity rating can also comprise a rating of a location where the identification features is received. The source validity rating can vary based on an evaluation of the reliability and/or verifiability of the source based on the source's location.

Third party verification can be received for the identification feature (operation 712). For example, a government agency can provide verification of a document received as an identification feature. As another example, an employer can provide verification of demographic information such as name, address, phone number, citizenship, and the like. As yet another example, a physician can provide verification of biometric information. Other examples are also possible, including combinations thereof. A second validity rating of the third party can also be determined (operation 714). The third party second validity rating can comprise an evaluation of the reliability of the third party providing the third party verification of the received identification feature.

In operation 716, a second identification feature weight is determined, comprising a weight to be placed on the second identification feature. The second identification feature weight can be based on at least one of the second feature validity rating, the second source where the second feature is received, the second source validity rating, the third party second verification of the identification feature, and the third party second validity rating. Where two or more second identification features are received, each identification feature can be associated with an identification feature weight.

Using the second identification feature and the identification feature weight, a session verification score is generated (operation 718). The session verification score can be stored, for example, in a memory associated with verification unit 106. The session identification score can also be generated using the base session score, though this is not a requirement.

The generated session verification score can be adjusted based on a transaction history associated with the user. For example, a history of previously generated session verification scores can be stored (e.g., in a memory associated with verification unit 106), which previous session verification scores were generated when access to a service was requested (such as illustrated in FIG. 6). The service can comprise a service for which access control by verification of an authentication can be applied, such as a banking service, a medical service, access to a location, a transactional service, a document preparation service, or another such service. Whether access to the service is granted or not based on the previous session verification score can be stored, for example, in a memory associated with verification unit 106. The transaction history can comprise one or more requests to access a service, an indication of the session verification score associated with the requester at the time the request is received, and an indication of whether access is granted to the service, among other things. Accordingly, it can be determined whether any transaction history is stored (operation 720). Based on the transaction history, the session verification score can be adjusted to be higher or lower (operation 722). For example, denial of access to a requested service can cause the session verification score to be adjusted lower, while granting of access to a requested service can cause the session verification score to be adjusted higher.

Next, a type of service requested can be determined (operation 724), and the session verification score can be adjusted based on the type of service (operation 726). For example, a requested service may involve multiple steps, and each step can require a separate verification. In an embodiment, separate verification steps can be required for a multi-part service to ensure that the parts of the service are performed in a particular order. For example, a patient scheduled to receive surgery may require certain tests prior to surgery, such as blood work, X-rays, the taking of a medical history, and the like. A threshold session verification score can be required to admit the patient to surgery, and until all of the required tests are performed, the patient's session verification score can be adjusted to be below the threshold. Further, each test can be associated with a different session verification score, and as each test is performed the session verification score can be adjusted. For example, a medical history can be associated with a first session verification score, X-rays can be associated with a second, higher verification score, and a blood tests can be associated with a third, yet higher session verification score, so that X-rays cannot be taken until a medical history is taken, and blood cannot be drawn for blood tests, until X-rays are taken, and so forth. Other examples are also possible. When all of the required tests are performed, the session verification score can be adjusted to meet the threshold, and the patient can be admitted to surgery thereafter.

As another example, in order to open a bank account, a certain number of forms of identification may be required. Until the required number of forms of identification are received, the session verification score can be adjusted to be below a required threshold session verification score (which can be different from a threshold session verification score required to be permitted to open the account). When the required number of forms of identification are received, the session verification score can be adjusted to meet the threshold. Other examples are also possible.

The base and session verification scores are compared (operation 728), and when a difference between the base and session verification scores meets a threshold a notification is generated (operation 730). For example, when a session verification score is lower than a base verification score by a threshold amount, a notification can be generated by verification unit 106, as the difference between the base and session verification scores may indicate a defect with one or more identification features, or an attempt at identity fraud, and the like.

The base verification score can be compared with a first service authorization threshold (operation 732), and the session verification score can be compared with a second service authorization threshold (operation 734). The service authorization thresholds reflect levels of verification required for access to the service. The service authorization thresholds can be determined by a provider of service 104, which can be different than an operator of verification unit 106. When the base verification score meets the first service authorization threshold and the session verification score meets the second service authorization threshold, access to the service can be granted (operation 736). It can also be required that a difference between the base and session verification scores are less than a threshold difference to grant access to the service.

In an embodiment, a user requests access to a secure location. The location can comprise a building or another location which requires verification of an authentication before entry to the location is permitted. Verification unit 106 can comprise a list of users permitted entry to the location, and source device 102 can comprise a device at an entrance to the location. Verification unit 106 can further comprise a base verification score associated with the user, wherein the base verification score was previously determined for the user, based on one or more identification features received and evaluated by verification unit 106.

The user can provide one or more identification features to source device 102. For example, source device 102 can scan a user's fingerprint or an identify card presented by the user, can examine the user's iris pattern, retinal vein pattern, hand vein pattern, venous or arterial pulse, blood pressure, can determine a voice print of the user's voice, and the like. The identification features, representations of the identification features, or information describing the identification features, can be sent over communication network 108 to verification unit 106. Verification unit 106 can determine a feature validity rating of each of the identification features. Verification unit 106 can also determine the source device (the device at the entrance to the location) and a source validity rating for the source device. Further, verification unit 106 can determine an age of each of the identification features, which in this example would approach zero for biometric data sampled at the entrance. Based on the feature validity rating, the source where the feature is received, the source validity rating, the third party verification of the identification feature, and the third party validity rating, an identification feature weight can be determined for each of the identification features. Further, verification unit 106 can generate a session verification score for the user based on the identification feature weights. The session verification score can be compared to the base verification score, and to an authorization threshold.

The user can be tentatively identified based on a comparison of the base verification score and the session verification score. Further, a difference between the base verifications score and the session verification score can be determined. When the difference of the base verification score and the session verification score meets or exceeds a threshold, a notification can be generated, such as an alert indicating a possible fraudulent attempt to enter the location. When the difference of the base verification score and the session verification score is below the threshold, and when the session verification score meets an authorization threshold, the user can be granted entry to the location. In a case where the difference of the base verification score and the session verification score is below the threshold and the session verification score does not meet the authorization threshold, additional identification features can be required, which can be evaluated and used to modify the session authentication score. When the modified authentication score meets the authorization threshold, then entry to the location can be granted.

In another embodiment, a user may request access to a first service based on a verification score associated with a second service. For example, a based verification score may be created for a user in order to access services at a gym, and further the user may desire to create an online banking account with a bank, which is a different entity from the gym.

The gym can use a system analogous to system 100 to establish a base verification score for gym members. A receptionist can ask the user for certain identification features, such as demographic information (name, a date of birth, a gender, address, etc.) and documentary identification features (a driver's license, passport, utility bill to demonstrate proof of name and address, etc.), and the identification features can be provided to source device 102. The system can determine if the added user already exists, and if so the accounts can be merged. The identification features, representations of the identification features, or information describing the identification features, can be sent over communication network 108 to verification unit 106. Verification unit 106 can determine a feature validity rating of each of the identification features. Verification unit 106 can also determine a source device (e.g., the device in the gym) and a source validity rating for the source device. Further, verification unit 106 can determine an age of each of the identification features. Where applicable, verification unit 106 can also attempt to receive third party verification of each of the identification features, and to determine a third party validity rating of each verifying third party. Based on the feature validity rating, the source where the feature is received, the source validity rating, the third party verification of the identification feature, and the third party validity rating, an identification feature weight can be determined for each of the identification features. Further, verification unit 106 can generate a base verification score for the patient based on the identification feature weights.

Next, the user attempts to create an online banking account with a bank, for example, at a bank branch location. A bank clerk can receive various identification features from the user. Where the bank and the gym each utilize a system comprising verification unit 106, verification unit 106 can determine if a record exists with identification features substantially similar to the identification features received at the bank, and can find the user's gym account. The identification features and bank information can be associated with the user's record at verification unit 106. The bank may not have access to the gym information associated with the user's record, and the gym may not have access to the bank information associated with the user's record (though an option may exist permitting the user to grant such access).

The user can be tentatively identified based on a comparison of the base verification score and the session verification score. Further, a difference between the base verifications score and the session verification score can be determined. When the difference of the base verification score and the session verification score meets or exceeds a threshold, a notification can be generated, such as an alert indicating a possible attempt to open the bank account with fraudulent identity information. When the difference of the base verification score and the session verification score is below the threshold, and when the session verification score meets an authorization threshold, the user can be permitted to open the bank account. In a case where the difference of the base verification score and the session verification score is below the threshold and the session verification score does not meet the authorization threshold, additional identification features can be required, which can be evaluated and used to modify the session authentication score. When the modified authentication score meets the authorization threshold, the user can be permitted to open the bank account. Further, the identification features received by the bank can be used to modify the base verification score, since the additional identification features can provide additional data points and increase the accuracy of a possible future verification by the user, either at the gym, or at the bank. Other examples are possible, including combinations of the foregoing.

Different service providers may determine different authorization thresholds required for access to a service. For example, a bank may require a higher level of verification, and concomitantly may impose a higher authorization threshold, than a gym. Further, each service provider may determine different authorization thresholds for the base verification score and the session verification score. Alternatively, or additionally, an operator of verification unit 106 can determine authorization thresholds for service providers based on the type of service provided. The authorization threshold(s) can further be based on required levels of security, confidentiality, by privacy requirements (such as legally mandated privacy procedures or requirements), to comply with terms of service by which the service provider may be bound, and the like.

Figure 8:
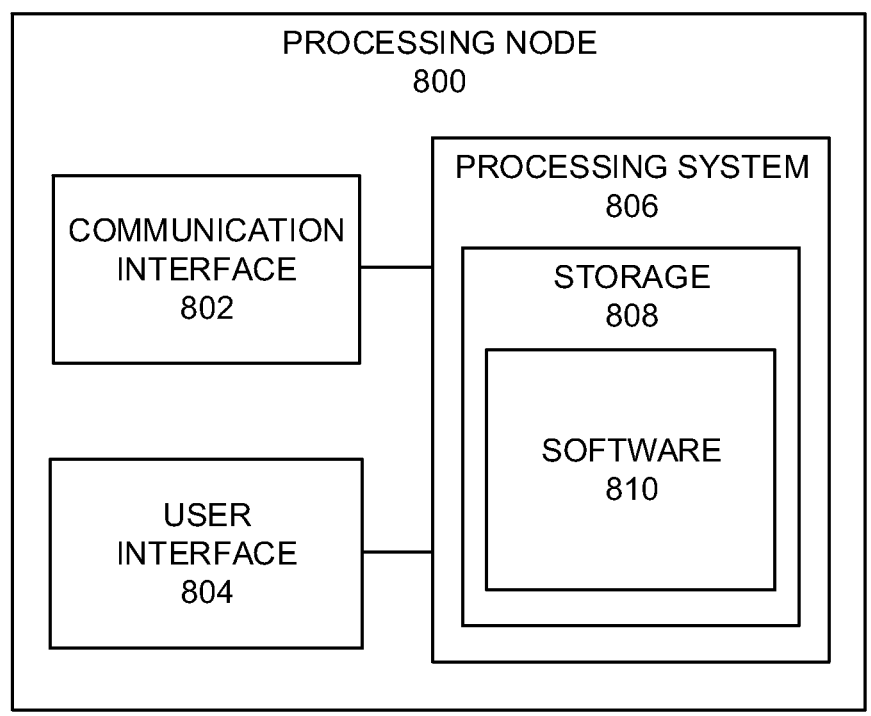
FIG. 8 illustrates an exemplary processing node.

FIG. 8 illustrates an exemplary processing node in a communication system. Processing node 800 comprises communication interface 802, user interface 804, and processing system 806 in communication with communication interface 802 and user interface 804. Processing node 800 can be configured to verify an authentication. Processing system 806 includes storage 808, which can comprise a disk drive, flash drive, memory circuitry, or other memory device. Storage 808 can store software 810 which is used in the operation of the processing node 800. Storage 808 may include a disk drive, flash drive, data storage circuitry, or some other memory apparatus. Software 810 may include computer programs, firmware, or some other form of machine-readable instructions, including an operating system, utilities, drivers, network interfaces, applications, or some other type of software. Processing system 806 may include a microprocessor and other circuitry to retrieve and execute software 810 from storage 808. Processing node 800 may further include other components such as a power management unit, a control interface unit, etc., which are omitted for clarity. Communication interface 802 permits processing node 800 to communicate with other network elements. User interface 804 permits the configuration and control of the operation of processing node 800.

Examples of processing node 800 include verification unit 106. Processing node 800 can also be an adjunct or component of a network element, such as an element of verification unit 106, or processing node 800 can be another network element of communication system 100. Further, the functionality of processing node 800 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A system of verifying an authentication, comprising:
    a source device, configured to receive an identification feature from a user, and to communicate the identification feature; and
    a verification unit, comprising a memory and a processor coupled to the memory, the processor configured with processor-executable instructions to:
        receive the identification feature from the source device;
        generate a base verification score associated with the user based on at least one identification input, the identification input comprising the identification feature, a feature validity rating, a source device validity rating, an age of the identification feature, a verification provided by a third party for the identification feature, and a validity rating of the third party, wherein
            the feature validity rating comprises a value that is increased or decreased by the processor based on a relative reliability of the identification feature,
            the source device validity rating comprises a value that is increased or decreased by the processor based on a relative reliability of a location of the source device, an operator of the source device, and whether the source device has been inspected and verified,
            the age of the identification feature comprises a weight that is increased or decreased by the processor based on the age of the identification feature,
            the validity rating of the third party comprises a value based on an evaluation by the processor of the reliability of the third party that provided the verification for the identification feature, and
            the base verification score is generated by the processor based on an identification feature weight that is calculated by the processor based on the feature validity rating, the source device validity rating, the age of the identification feature, the verification provided by the third party for the identification feature, and the validity rating of the third party;
        receive a request to access a service, wherein the verification unit compares the base verification score with a service authorization threshold score associated with the service; and
        grant access to the service when the base verification score meets the service authorization threshold score.
2. The system of claim 1, wherein the source device further comprises at least one of a document scanner, a fingerprint scanner, a retina scanner, an iris scanner, a vein pattern scanner, a blood pressure detector, a blood vessel pulse detector, an electrocardiogram, a DNA scanner, a voiceprint analyzer, a touch screen input unit, a smart card scanner, a face recognition scanner, a signature pad, a barcode scanner, and a credit card reader.
3. The system of claim 1, wherein when the source device meets a first certification criteria the source device is associated with a first source validity rating.
4. The system of claim 3, wherein when the source device meets a second certification criteria the source device is associated with a second source validity rating.
5. The system of claim 1, wherein when the source device meets a first location criteria the source validity rating is increased.
6. The system of claim 1, wherein when the source device meets a second location criteria the source validity rating is decreased.
7. The system of claim 1, wherein the verification unit is further configured to:
    decrease the identification feature weight when the age of the identification feature meets a threshold.
8. The system of claim 1, wherein the verification unit is further configured to:
    adjust the base verification score based on a transaction history associated with the user.
9. A system of verifying an authentication, comprising:
    a verification unit, comprising a memory and a processor coupled to the memory, the processor configured with processor-executable instructions to
        determine a base verification score associated with a user based on at least one identification input, the identification input comprising an identification feature, a feature validity rating, a source where the identification feature is received, a source device validity rating, an age of the identification feature, a verification provided by a third party for the identification feature, and a validity rating of the third party, wherein
            the feature validity rating comprises a value that is increased or decreased by the processor based on a relative reliability of the identification feature,
            the source device validity rating comprises a value is increased or decreased by the processor based on a relative reliability of a location of the source device, an operator of the source device, and whether the source device has been inspected and verified,
            the age of the identification feature comprises a weight that is increased or decreased by the processor based on the age of the identification feature,
            the validity rating of the third party comprises a value based on an evaluation by the processor of the reliability of the third party that provided the verification for the identification feature, and
            the base verification score is generated by the processor based on an identification feature weight that is calculated by the processor based on the feature validity rating, the source device validity rating, the age of the identification feature, the verification provided by the third party for the identification feature, and the validity rating of the third party; and
        receive a request to access a service; and
    a source device, configured to receive a second identification feature from a user and to communicate the second identification feature to the verification unit,
    wherein the verification unit is further configured to determine a session verification score associated with the user based on the base verification score and at least one second identification input, the second identification input comprising the second identification feature, a second feature validity rating, and a source device validity rating, compare the session verification score with a service authorization threshold score associated with the service, and grant access to the service when the session verification score meets the service authorization threshold score.

10. The system of claim 9, wherein the source device validity rating is further based on the location of the source device and the type of source device.

11. The system of claim 9, wherein the second identification input further comprises a second identification feature weight based on the second feature validity rating and the second source device validity rating.

12. The system of claim 11, wherein the verification unit is further configured to determine an age of the second identification feature; and decrease the second identification feature weight when the age of the identification feature meets a threshold.

13. The system of claim 9, wherein the second identification input further comprises a third party verification of the second identification feature and a third party validity of the verifying third party.

14. The system of claim 9, wherein the verification unit is further configured to:

compare the session verification score with a first service authorization threshold associated with the service and compare the base verification score with a second service authorization threshold associated with the service, and grant access to the service when the session verification score meets the first service authorization threshold and the base verification score meets the second service authorization threshold.

15. The system of claim 9, wherein the session verification score is further based on a type of service for which access is requested.

16. The system of claim 9, wherein the verification unit is further configured to:

compare the session verification score with the base verification score; and grant access to the service when a difference between the session verification score and the base verification score meets a service authorization threshold.

\* \* \* \* \*